United States Patent [19]

Eisen et al.

[11] 4,383,179

[45] May 10, 1983

[54] NEUTRON DOSIMETER

[76] Inventors: Yossi Eisen, Branizti 19 Str., Rishon Le Zion; Yair Shamai, Marton Str. 3, Rehovot; Even Ovadia, Idmit 12 Str., Givataim; Sergio Faermann, Hefetz Haim Str., No. 53/7, Ap. 14, Petach Tikvah, all of Israel

[21] Appl. No.: 184,667

[22] Filed: Sep. 8, 1980

[51] Int. Cl.³ .............................. G01T 1/04; G01T 3/00
[52] U.S. Cl. .................................. 250/472.1; 250/390; 250/392
[58] Field of Search ............... 250/390, 391, 392, 472, 250/473, 484; 376/254

[56] References Cited

U.S. PATENT DOCUMENTS

3,932,758  1/1976  Burgkhardt et al. .............. 250/390
4,100,414  7/1978  Distenfeld ........................ 250/391

Primary Examiner—Alfred E. Smith
Assistant Examiner—Janice A. Howell
Attorney, Agent, or Firm—Fleit, Jacobson & Cohn

[57] ABSTRACT

According to the present invention there is provided a neutron dosimeter sensitive in the region of from 1 eV to about 14 MeV which comprises a $^{10}B$ miniature spectrometer for the region of 1 eV to 30 KeV, a $^{10}B$ albedo detector for the range of 30 KeV to 1 MeV and a suitable polymer foil selected from polycarbonate foil and a plastic made from a diester of a carbonic acid, such as the product sold under the trade name of CR-39 with a thin proton radiator for the region of 1 MeV to 14 MeV.

8 Claims, 8 Drawing Figures

NEUTRON DOSIMETER

FIELD OF THE INVENTION

There is provided a personnel neutron dosimeter which is sensitive in the region of about 1 eV and up to about 14 MeV. The dosimeter comprises three parts which are combined in order to attain this very wide range of sensitivity. The novel dosimeter is portable, small and inexpensive and it can be used with personnel of atomic energy establishments and with other personnel engaged in research involving various radiations.

BACKGROUND OF THE INVENTION

In recent years great effort has been devoted to the development of personnel neutron dosimeters. Attempts to replace the conventional emulsion dosimeter, which has many shortcomings, by polycarbonate foils have been successful for energies above 1 MeV (Gr78, Os77, Ei80a). Damage sites produced by recoil carbon and oxygen nuclei are revealed as visible pits by electrochemical etching, a technique which was introduced by Tommasino (To70) and later used successfully by Sohrabi (So74). Albedo dosimeters based on the backscattering of thermal neutrons from the body and usually composed of $^6$LiF and $^7$LiF pairs are used in several laboratories (Ha77, Gr78, Pi78). These dosimeters are strongly energy dependent and sensitive to gamma and beta radiations. Quite recently a new type of plastic, made from a diester of a carbonic acid and sold under the trade name CR-39 by American Acrylic Company (hereinafter referred to as a CR-39 plastic, a CR-39 material, or as a CR-39 foil) CR-39, was developed (Car78, Ca78) and is expected to be useful in the detection of fast and medium energy neutrons down to 200 keV. This sensitivity is based on damage sites produced by recoil protons. Recent studies of this material (To80) indicate that low energy proton tracks below 0.6 MeV are revealed by electrochemical etching with very low efficiency. Chemical etching alone is more efficient but it results in small pits which need very large magnification for reading, making the scanning procedure rather tedious. Presently, no personnel neutron dosimeter is Rem equivalent in the energy region of 1 eV to 1 MeV. Also, because the above dosimeters are complex and are composed of several components (Pi78, Gr80), the dose interpretation is difficult.

SUMMARY OF THE INVENTION

There is provided a novel neutron dosimeter which is sensitive in a very wide range. A typical embodiment of the dosimeter of the invention has a sensitivity in the range of 1 eV to about 14 MeV. A typical dosimeter of the invention comprises three measurement regions, which in combination give the wide desired range of sensitivity. The first two parts are a $^{10}$B miniature spectrometer for the enegy region of 1 eV to 30 KeV and an $^{10}$B albedo detector for determining the energy range of 30 KeV to 1 MeV, both of which are in contact with a suitable high-polymer foil such as polycarbonate foil or CR-39 plastic. The third region of the dosimeter is a plastic detector, which is either a bare polycarbonate foil or CR-39 material covered with a thin polyethylene proton radiator for the high energy region of 1 MeV to 14 MeV.

According to a preferred embodiment the $^{10}$B spectrometer comprises a number of $^{10}$B layers, used as alpha and $^7$Li radiators, as described. A typical dosimeter according to the invention comprises 3 or 4 such $^{10}$B layers, and a combination of the number of particles emerging from the said radiators is REM equivalent in the 1 eV to 1 MeV range. The region which is not masked by the $^{10}$B layers is indicative of the 1 MeV to 14 MeV range.

The novel dosimeter can also be used to ascertain the energy of the incident neutrons. According to the present invention a specific etching techinique is provided. This electrochemical etching process reveals simutaneously damage sites produced by alpha, $^7$Li and heavy ion recoil particles (carbon and oxygen ions due to high energy neutrons).

The novel dosimeter is easy to handle and it is insensitive to beta and gamma radiations. Fading is negligible.

DESCRIPTION OF THE PREFERRED EMBODIMENT

Figure 1A:
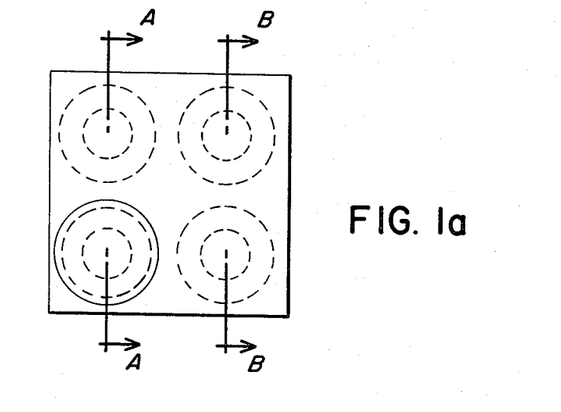
FIGS. 1a–1c—A schematic diagram of the personnel neutron dosimeter. 2×actual size.
Figure 1B:
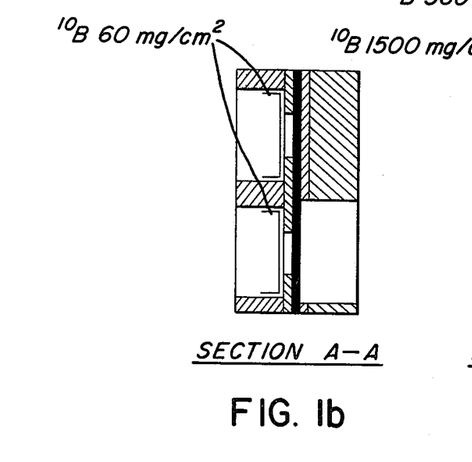
Figure 1C:
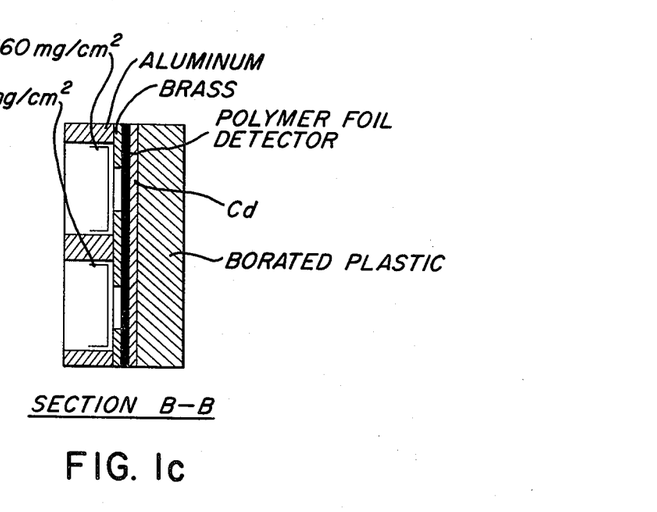

The dosimeter, show in FIG. 1, is composed of the following three sections. (A) The $^{10}$B miniature spectrometer consists of three 6 mm diam. cylindrical $^{10}$B layers 60,360 and 1500 mg/cm$^2$ thick, prepared by pressing $^{10}$B powder (enriched to 92%). The thinnest layer is attached to a 1 mm Al disk in order to obtain rigidity. The three layers are placed 0.4 mm from the 370 μm thick polycarbonate foil (Transilwrap Co., Illinois). The layers are covered with Cd to shield the boron from thermal neutrons. Towards the body they are also masked by borated plastic to prevent low energy albedo epithermal neutrons from reaching them. (B) The albedo detector consists of another 60 mg/cm$^2$ 10B layer in front of the polycarbonate foil. It is unshielded toward the body and collimated with a 12 mm diameter aperature in the Cd and borated plastic. (C) The third part of the dosimeter consists of regions of the polycarbonate foil not masked by boron material.

The dimensions of the dosimeter are 2.5×2.5×1 cm. The polycarbonate area masked by boron material is about 1 cm² and the unmasked region is about 5 cm². The distance from the surface of the boron to the body is ~8 mm. Parts A and B record the dose in the energy region of 1 eV to 1 MeV and part C records the dose about 1 MeV.

The dosimeter is based on three interactions of the incident neutrons: part A—direct interaction with the three $^{10}$B layers via the $^{10}$B(n,α)$^{7}$Li reaction and scattering of α and $^{7}$Li particles toward the polycarbonate foil; part B—interaction of albedo neutrons with the thin $^{10}$B layer via the $^{10}$B(n,α)$^{7}$Li reaction and backscattering of α and $^{7}$Li particles toward the polycarbonate foil; part C—elastic interaction of fast neutrons with the carbon and oxygen nuclei which are components of the polycarbonate molecule.

The main aim of the theoretical study was to find a function of the number of particles (α and $^{7}$Li) reaching the polycarbonate foil beyond the $^{10}$B layers which is proportional to the dose regardless of the neutron energy in the range from 1 eV to 1 MeV. By combining this expression with the response of the polycarbonate for fast neutrons, it is possible to extract the total dose for neutrons between 1 eV and 14 MeV.

In the following, part A of the dosimeter will be called the "miniature boron spectrometer", and part B the "albedo boron detector".

The Miniature Boron Spectrometer

The first part of the dosimeter is called the "miniature boron spectrometer" since it can determine the neutron energy in the region of 1 eV to 30 keV, using the output of the three boron layers which are of different thicknesses. Furthermore, these layers can also determine the dose in this energy region.

In calculating the number of particles reaching the polycarbonate foil beyond the $^{10}$B layers of the miniature spectrometer, the following assumptions were made:

(a) The neutrons are incident normal to the surface of the boron layers.

(b) The neutrons which interact with a narrow region of boron in contact with the plastic foil are not moderated by passage through the full length of the boron layer.

(c) All particles which emerge from the $^{10}$B layer due to the (n,α) interaction, and reach the polycarbonate foil with energies greater than 0.2 MeV, produce damage sites (Ka68) that can be revealed by electrochemical etching with unit efficiency independent of the particle energy.

(d) The $^{10}$B(n,α)$^{7}$Li cross sections are isotropic in the center-of-mass system for neutron energies below 1 MeV.

The three $^{10}$B layers which comprise the miniature spectrometer are thicker than the maximum range of the emitted alpha or $^{7}$Li particles obtained from the $^{10}$B(n,α)$^{7}$Li reaction. (Ranges are of the order of 1 mg/cm²). A neutron passing through one of these layers may either be absorbed or elastically scattered or cross through the layer without any interaction. If the neutron is absorbed via a (n,α) process in a narrow region of maximum thickness $t_{max}$, of the order ~1 mg/cm², in contact with the polycarbonate foil, alpha or $^{7}$Li particles may reach the foil and produce damage sites. The thickness $t_{max}$ from which alpha or $^{7}$Li particles can emerge with sufficient energy depends on the incident neutron energy, or equivalently, on the energy of the alpha particles moving in the forward direction. (For low neutron energies ≦50 keV, $t_{max}$ is almost constant since the reaction kinematics is mainly governed by the large positive Q value.) For each effective thickness $t_c$≦$t_{max}$, there exists a maximum scattering angle $\theta_{max}$ beyond which alpha (or $^{7}$Li) particles emerging from the layers have energies lower than 0.2 MeV and do not form damage sites that can be revealed by electrochemical etching. If the total thickness of the layer is t(mg/cm²), then the total number of alpha particles per unit dose recorded on the plastic foil beyond each of the three $^{10}$B layers is given by the following expression:

$$N_i = \overline{\phi} \int_{t=0}^{t_{max}} dt_c \int_{\theta=0}^{\theta_{max}(t_c)} d\Omega e^{-\mu_E(t-t_c)} \frac{d\sigma}{d\Omega}$$

where $\overline{\phi}$ (n/cm²) is the neutron flux per unit dose $\mu_E$ is the total (reaction+elastic) macroscopic cross section for incident energy E and $d\sigma/d\Omega$ is the differential macroscopic cross section for the (n,α) reaction. A similar expression can be given for the number of $^{7}$Li particles per unit dose. Since the stopping power of $^{7}$Li in boron is different from that of alpha particles, $\theta_{max}(t_c)$ will be different. Also, the transformation from the center-of-mass to the laboratory system differs for the different particles. The number of $^{7}$Li particles emerging from the B layers is approximately 30% of the number of alpha particles, for all neutron energies.

Figure 2:
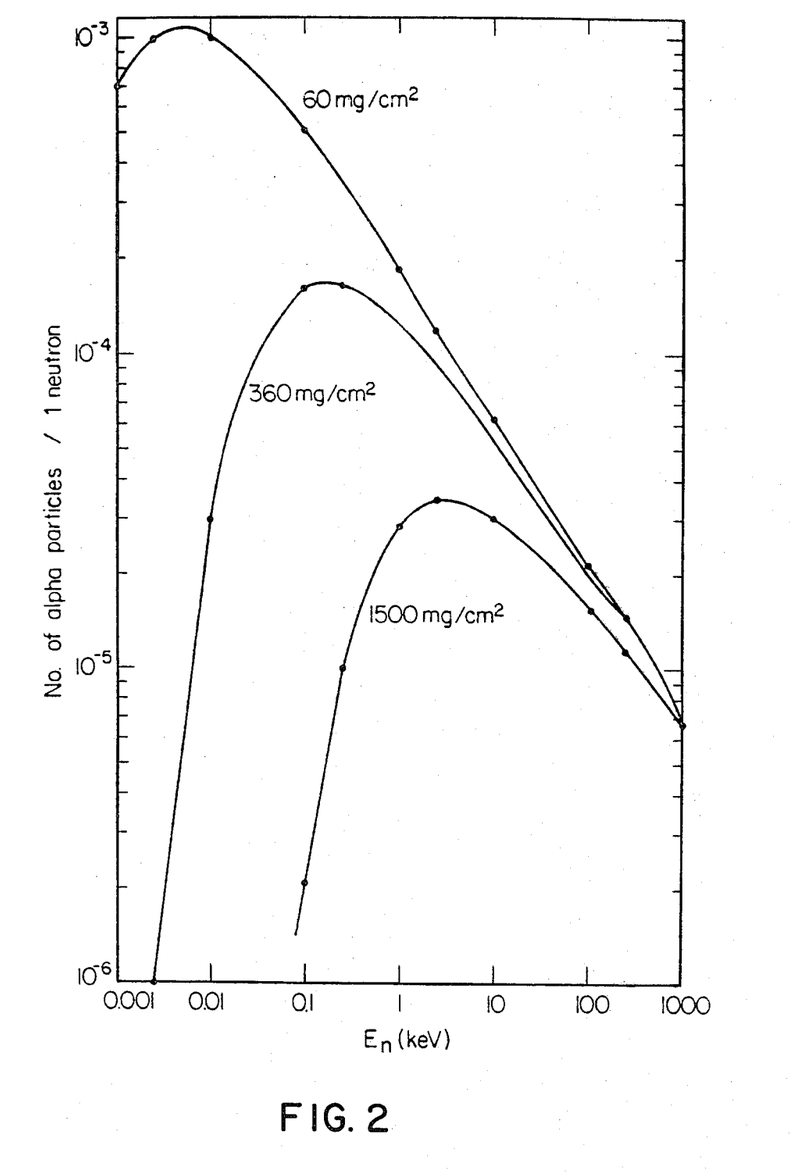
FIG. 2—Theoretical curves of the number of alpha particles per incident neutron emerging from the $3^{10}$B layers (60, 360 and 1500 mg/cm$^2$) of the miniature spectrometer and reaching the polycarbonate foil with energies greater than 0.2 MeV, as a function of neutron energy, $E_n$.

The number of alpha particles per incident neutron emerging from each of the $^{10}$B layers in the miniature spectrometer is shown in FIG. 2. In this figure one can observe the combined effect of the absorption of neutrons in the major part of the layer, from which the α and $^{7}$Li particles cannot reach the detector, and the absorption in a very thin layer in contact with the plastic detector. While at very low energies alpha (and $^{7}$Li) particles reach the detector only from the thinnest layer (60 mg/cm²), at energies higher than 30 keV they emerge almost equally well from all layers. One can also see that the number of particles reaching the plastic detector has a maximum at different energies for the three layers. These maxima are at 5 eV, 200 eV and 3 keV for the 60, 360 and 1500 mg/cm² layers, respectively. One might conclude that the three $^{10}$B layers could serve as a neutron spectrometer for monoenergetic neutrons in the energy region from 1 eV to 30 keV. It was found that for both monoenergetic and polyenergetic neutrons, the dose below 30 keV can be expressed as a linear combination of the number of particles emerging from the three $^{10}$B layers.

The Albedo $^{10}$B Detector

As mentioned above, for incident neutron energies above 30 keV, the yield of particles from the three $^{10}$B layers in the miniature spectrometer is almost equal. Moreover, this yield decreases with increasing energy. The flux per unit dose also decreases with increasing energy. Therefore, the aim was to find a physical function which increases with energy, for correcting the expression of dose above 30 keV, in order to obtain an expression proportional to the dose in the overall energy region of 1 eV to 1 MeV. To achieve this goal we have introduced a fourth 60 mg/cm² thick $^{10}$B layer which is not shielded toward the body. Albedo neutrons (thermal and epithermal) returning from the body, might interact via a (n,α) reaction with a thin $^{10}$B layer in contact with the plastic detector, producing alpha or $^7$Li particles which may be backscattered to the plastic foil and damage it. The yield of particles beyond this fourth $^{10}$B layer depends mainly on the relative neutron flux returning from the body. This relative flux was calculated by Alsmiller and Barish (A174) for normal incidence of the neutron. (Only the thermal contribution was used since it is the dominant one.) This $^{10}$B layer also interacts directly with incident neutrons. The number of particles which emerge due to direct interaction is usually much smaller than that due to albedo neutrons. In any case, the latter number can be calculated by subtracting the number of particles emerging from the thinnest layer of the spectrometer ($N_1$) from the number of particles emerging from the albedo detector ($N_4$). This net number is denoted by $N_4'$ ($N_4' = N_4 - N_1$).

Figure 3:
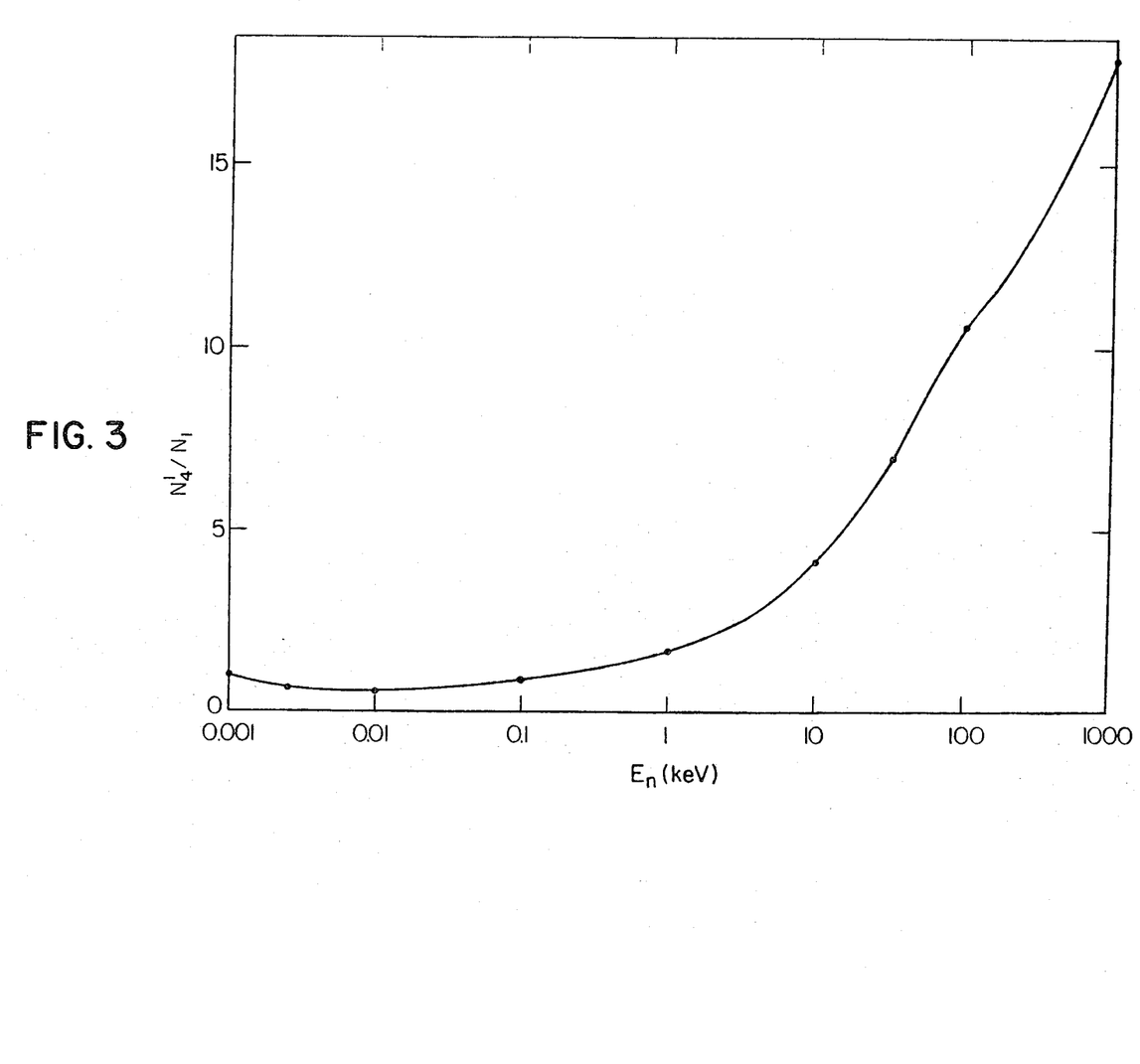
FIG. 3—Theoretical curve of the ratio between the particles emerging from the albedo detector due to thermal albedo neutrons and from the 60 mg/cm$^2$ $^{10}$B layer of the miniature spectrometer, as a function of the neutron energy $E_n$.

The ratio between the number of particles reaching the plastic detector due to thermal albedo neutrons ($N_4'$) to that due to direct interaction ($N_1$) is given in FIG. 3. As can be observed in the figure, this ratio is almost constant up to 1 keV and increases rapidly above this energy. The magnitude of the ratio $N_4'/N_1$ depends on the collimation of the dosimeter to thermal neutrons backscattered from the body and on the distance of the dosimeter from the body. It is assumed that these factors do not change the shape of $N_4'/N_1$ as a function of energy.

As mentioned before, the three $^{10}$B layers of thicknesses 60, 360 and 1500 mg/cm$^2$ determine the dose in the energy region of 1 eV to 30 keV. The representation of dose from 1 eV to 1 MeV takes into account the number of particles emerging from each of the three $^{10}$B layers ($N_1$, $N_2$ and $N_3$) in the miniature spectrometer and the number of particles emerging from the $^{10}$B albedo detector which are due to albedo neutrons only ($N_4'$).

Figure 4:
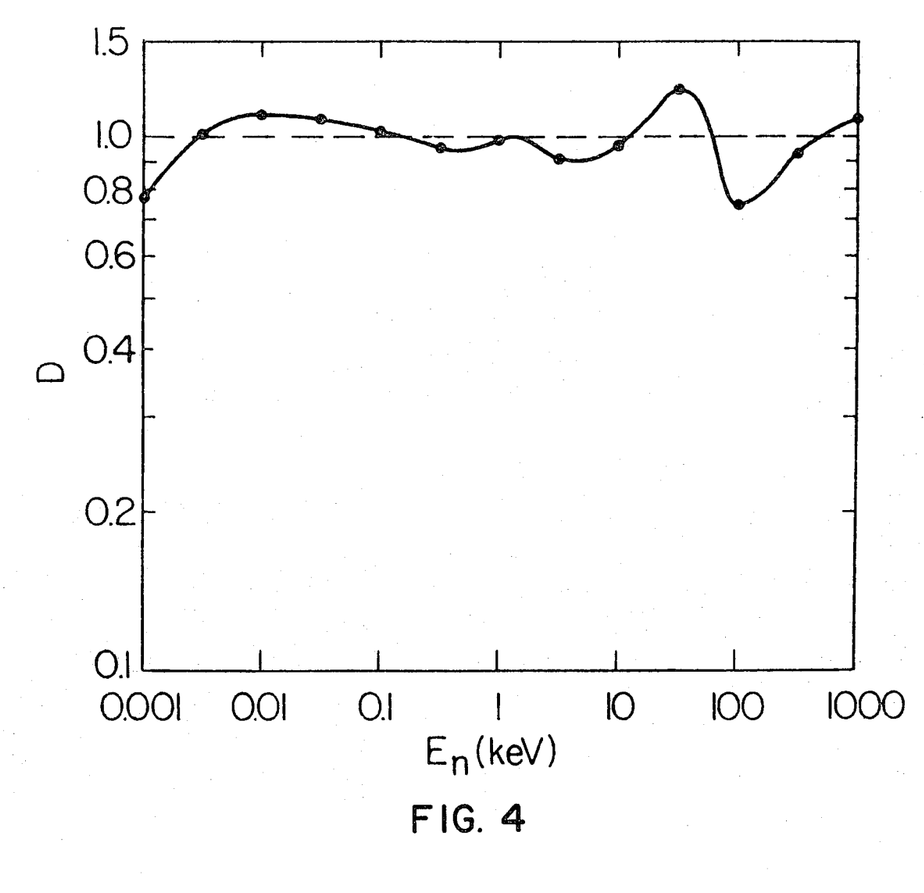
FIG. 4—Theoretical curve (solid) of the dose D normalized to 1 mRem as given in formula (2). Dashed curve through unity represents an ideal response when using dose/flux conversion factors given in Refs. NC71 and Ha77
Figure 5:
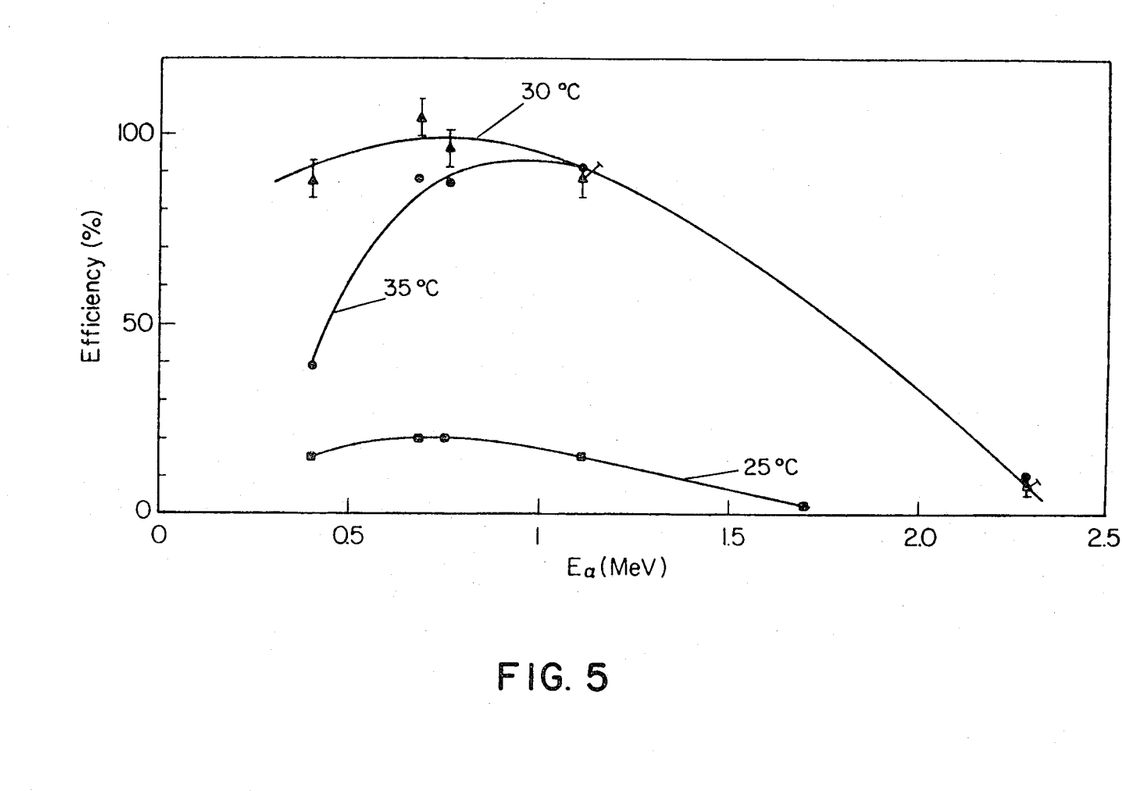
FIG. 5—The effect of the temperature of the etching solution on the efficiency for revealing damage sites due to alpha particles as a function of alpha particle energy $E_\alpha$. The etching solution is 5.5 N KOH mixed with 14% ethyl alcohol by volume.
Figure 6:
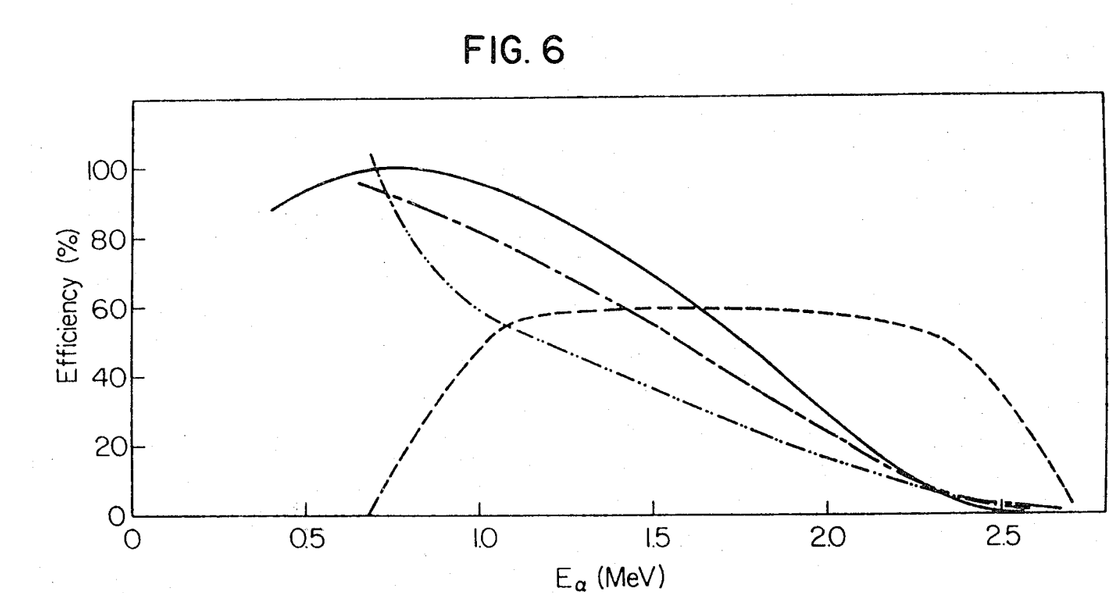
FIG. 6—The effect of the length of the pre-etching period on the efficiency for revealing damage sites due to alpha particles as a function of their energies. ——··——··no pre-etching; ———— 2 hours; ———— —— 16 hours; —— —— 24 hours.

It was found that a certain combination of $N_i$ ($i=1$–$3$) and $N_4'$ is dose equivalent up to 1 MeV and is almost independent of the incident neutron energy. The dose equivalent D is given by $$D = (aN_1 + bN_2 + cN_3)[1 + \exp(d + eN_4'/N_1)] \qquad (2)$$

The normalized expression of D as a function of energy is given in FIG. 4. The difference between the values of D and unity represent the deviations from the recommended neutron fluence-to-dose equivalent conversion factors (NC71, Ha75). These deviations do not exceed ±20%.

The coefficients a, b, c, d and e in expression (2) were found by means of an automatic fit program which minimized D to the dose-to-fluence conversion factors at each energy. Their values were found to be: $a = 5.15 \times 10^{-4}$, $b = 1.13 \times 10^{-3}$, $c = 4.46 \times 10^{-3}$, $d = -1.55$ and $e = 0.23$. The coefficients a, b and c are expressed in mRem/(particles/cm$^2$). The coefficient e may be scaled up or down depending on the collimation of the albedo detector towards the body and on the body-to-dosimeter separation. It was found that the parameters c and d are correlated. A decrease in the value of c leads to a decrease in the absolute value of d.

ELECTROCHEMICAL ETCHING CONDITIONS

General Considerations

Two types of damage sites are produced in the polycarbonate foil used as the detector in the present dosimeter: (a) carbon and oxygen recoil nuclei in the region unmasked by boron material and (b) alpha and $^7$Li particles in the regions masked by $^{10}$B layers. It was assumed that the detection efficiency for particles of the second kind is constant above 0.2 MeV. It should be noted that the detection of $^7$Li particles was not investigated experimentally. However, since the dE/dx of $^7$Li particles is larger than that of alpha particles, it was assumed that the electrochemical etching conditions which reveal alpha, carbon and oxygen particles also reveal $^7$Li particles. The energies of alpha and $^7$Li particles emerging from the $^{10}$B layers depend on the incident energy of the neutrons. Since the $^{10}$B(n,α)$^7$Li reaction has a high positive Q value, the spectrum of emerging particles will be almost the same for neutron energies up to 300 keV. Above 300 keV the mean energy increases with an increase in incident neutron energy. In order to use the areas masked by $^{10}$B layers for neutron energies up to 1 MeV, the plastic detector should have a flat response to alpha particles up to at least 2.1 MeV. The detection efficiency was investigated by irradiating the polycarbonate foils with alpha particles having mean energies from 0.35 to 3.0 MeV. Energies were varied by moderating $^{241}$Am alpha particles with thin layers of aluminum and aluminized mylar. The efficiency was determined by comparing the number of pits obtained to the number of alpha particles in a Si detector which was placed in the position of the polycarbonate foil.

The electrochemical etching investigation was undertaken to find the optimum conditions for achieving a constant detection efficiency for alph particles up to ~2.1 MeV and to reveal these damage sites simultaneously with those produced by carbon and oxygen nuclei.

In most tests, unless specified otherwise, the voltage across the polycarbonate foil was 1000 V, the frequency 1900 Hz, the chemical pre-etching period 2 hours, the electrochemical etching period 4 hours, the temperature 30° C., and the etching solution was 5.5 N KOH mixed with 14% ethyl alcohol by volume. In each test the following factors were investigated: (a) the efficiencies with which damage sites of both kinds, as discussed above, are revealed (b) the background and (c) the minimum detectable doses.

CR-39 foils were also tested with the intention of extending the α particles energy region where damage sites could be detected.

Tests at temperatures ranging from 20° to 35° C. showed a strong temperature dependence of the efficiency with which damage sites due to alpha particles are revealed. Efficiencies are high only at temperatures greater than 28° C.; at 20° C. efficiencies are extremely low. It should be noted that the detection efficiency for α-particles having energies lower than 0.7 MeV decreases at temperatures higher than 30° C. This is due to an increase with temperature in the velocity with which the surface of the polycarbonate foil is removed. It was also found that the mean pit diameter increases with temperature. At 25° C. it is about 63 μm and at 35° C. about 120 μm.

Damage sites due to fast neutrons from $^{252}$Cf and $^{239}$Pu-Be sources were revealed in the whole temperature range from 20° to 35° C. but with increasing efficiency and pit diameters at the higher temperatures. At 20° C. efficiencies and diameters decreased quite dramatically. Detection efficiencies for $^{252}$Cf neutrons were found to be 5, 10 and 14 pits/cm$^2$/100 mRem at 20°, 25° and 30° C., respectively. It was found that the mean pit diameter due to carbon and oxygen is larger by about 20% than that due to alpha particles. The background also increased with temperature from 2 pits/cm$^2$ at 20° C. to 7 pits/cm$^2$ at 30° C.

The minimum detectable dose for $^{252}$Cf neutrons at 30° C. when an area of 4 cm$^2$ is recorded is ~30 mRem. For $^{239}$Pu-Be neutrons this threshold is lower by almost a factor of two.

Effect of the Addition of Ethyl Alcohol to the KOH Solution

Tests were performed at 30° C. with different amounts of ethyl alcohol in the KOH solution. At a concentration of 7% ethyl alcohol alpha particles were revealed with 20% of the efficiency obtained with a concentration of 14%. Also, the pit diameters decreased dramatically with a decrease in the fraction of ethyl alcohol in the solution. An increase of ethyl alcohol does not significantly change the efficiency for damage sites of high energy alpha particles. Adding ethyl alcohol to the etching solution is much more effective for revealing damage sites due to alpha particles than to carbon and oxygen recoil nuclei. Somogy (So77) and Sohrabi (So79) used a large fraction of alcohol in their etching solution.

Previous investigations on foils sold under the trade name of Makrofol-E showed a critical field strength for each alpha particle energy, below which the revealing efficiency is zero. The critical field strength increases with alpha particle energy.

In the present study tests were performed at 1000 and 1200 V across the polycarbonate foil. Only a small change in the detection efficiency for alpha particles having energies higher than 1.7 MeV was detected. The background more than doubled when the higher voltage was applied, from 7 pits/cm$^2$ at 1000 V to about 15 pits/cm$^2$ at 1200 V. The lowest measurable dose for $^{252}$Cf neutrons also increased from ~30 mRem at 1000 V to ~50 mRem at 1200 V.

CR-39 foils (Pershore Co., England), 600 μm thick, were irradiated with alpha particles having mean energies from 0.35 to 3.0 MeV. The damage sites were revealed with a 7 N KOH solution at 20° C., using a chemical pre-etching period of 17 hours and an electrochemical etching period of 3.5 hours. At these conditions alpha particles having energies of 0.35 to 3 MeV were revealed with an efficiency of one. At pre-etching periods shorter than 6 hours the efficiency was low and the diameter of the pits was rather small. When the temperature of the solution was higher than 25° C. the background increased quite sharply.

IRRADIATION OF THE DOSSIER

The dosimeter was irradiated at the Soreq scattering-free neutron facility. Two neutron sources were used; a polyenergetic $^{252}$Cf fast neutron source with an intensity of ~10$^8$ n/sec and a 24 keV monoenergetic $^{124}$Sb-Be source with an intensity of ~10$^7$ n/sec. Both sources were calibrated at the NPL laboratory in England. Six irradiation configurations were used. The firt configuration used mainly neutrons above 1 MeV ($^{252}$Cf source), three configurations used a mixture of neutrons above and below 1 MeV (neutrons from $^{252}$Cf source moderated through 5 and 10 cm cylinders of H$_2$O and D$_2$O) and two configurations used 24 keV $^{124}$Sb-Be neutrons with and without moderation through 5 cm H$_2$O. The dosimeter was irradiated at doses ranging from 20 mRem to 1.5 Rem in contact and without contact with a phantom. The difference between the number of particles emerging from the boron spectrometer in these two cases gave a measure of the number of epithermal albedo neutrons impinging on the $^{10}$B layers. This number was found to be small. The neutron doses obtained from the moderated neutron sources were measured by a Rem counter (such as those sold under the trade name SNOOPY, hereinafter referred to as SNOOPY). Relative to a calibration based upon an Am-Be source there is an over-response of the SNOOPY for $^{252}$Cf neutrons by a factor of 1.25. When comparing the dose of the $^{124}$Sb-Be source calculated by the NCRP38 (NC71) conversion factor with the SNOOPY reading we found an over-response of the SNOOPY by a factor of 5.3. This latter factor is consistent with a recent study by Rogers. Doses were corrected accordingly.

The fast neutron doses above ~1 MeV from the moderated $^{252}$Cf neutron sources were measured using a $^{237}$Np fission chamber. It was assumed that the shape of the high energy neutron flux is the same as that of the bare $^{252}$Cf source and a conversion factor of 7.8 n/sec/cm$^2$ per mRem/h was used for this part of the spectrum. The thermal neutron doses were measured using gold foils and also a $^{235}$U fission chamber. In all cases, it was found that the fraction of dose due to thermal neutrons is small and is of the order of few percent of the total dose.

EXTRACTION OF THE TOTAL DOSE FROM THE DOSIMETER

The total dose is extracted using the number of pits obtained in the five regions of the dosimeter: $N_1$, $N_2$ and $N_3$ beyond the miniature spectrometer, $N_4'$ beyond the albedo detector and $N_5$ in the region unmasked by $^{10}$B material. First the dose above about 1 MeV, D', is extracted from $N_5$ using the response of the polycarbonate to fast neutrons (Ei80a). Since this response is not completely flat (a difference of about a factor of 2 between $^{252}$Cf neutrons and neutrons from a $^{239}$Pu-Be source), the energy has to be considered. In order to find the experimental dose below about 1 MeV, D(calc), we subtract from $N_1$, $N_2$, $N_3$ and $N_4'$, the value $N_5$ and also the number of alpha and $^7$Li particles, $N_6$, which are generated by high energy neutrons above 1 MeV. We assume that $N_6$ is equal to the values given in Table 1 for $^{252}$Cf neutrons. (This assumption introduces only a small error.) By this subtraction, a new set of numbers $K_1=N_1-M$, $K_2=N_2-M$, $K_3=N_3-M$ and $K_4'=N_4'-M$ (where $M=N_5+N_6$) is obtained (see Table 1). D(calc) is obtained by substituting these numbers into formula (2).

Optimized Electrochemical Etching Conditions $N_1$, $N_2$ and $N_3$ were obtained from enriched $^{10}$B layers and $N_4$ from a 60 mg/cm$^2$ natural boron layer.

Detection efficiencies of $(80\pm20)\%$ for alpha particles in the energy range up to 1.7 MeV were obtained under the following conditions: voltage 1000 V (R.M.S.), frequency 1900 Hz, solution temperature 30° C., etching solution 5.5 N KOH mixed with 14% ethyl alcohol by volume, chemical pre-etching period 2 hours and electrochemical etching period 4 hours. The detection efficiency for alpha particles above 1.7 MeV is small. While this efficiency can be increased by increasing the chemical pre-etching period, the detection efficiency for low energy alpha particles decreases.

It was found that the temperature of the etching solution and the percentage of ethyl alcohol in the KOH solution are very critical in revealing damage sites due to alpha particles, but less so for carbon and oxygen nuclei.

Under the above mentioned optimized conditions the background is about 7 pits/cm$^2$. When a 4 cm$^2$ area in the region unmasked by $^{10}$B material is recorded, the minimum detectable dose for $^{252}$Cf neutrons is about 30 mRem.

The dosimeter in contact with a phantom was irradiated by six different neutron spectra. The following can be seen from the results of these irradiations, given in Table 1:

(a) $K_1/K_3$ (the ratio of the number of particles emerging from the thinnest layer to those emerging from the thickest layer) increases when the effective neutron energy is decreased by moderation. This increase is seen clearly by comparing the exposure to $^{124}$Sb-Be neutrons with the exposure to neutrons from the same source moderated by 5 cm H$_2$O. The ratio $N_1/N_3$ is close to unity with the $^{252}$Cf source, as expected.

(b) $K_4'/K_1$ decreases as the effective neutron energy is decreased by moderation. For the highest energy ($^{252}$Cf source) this ratio is around 30 while for the lowest energy ($^{124}$Sb-Be moderated by 5 cm H$_2$O) this ratio is around 7.

Good agreement is seen in Table 1 between the measured dose D(exp) in the energy region 1 eV to ~1 MeV and the dose calculated using formula (2) D(calc).

The lowest and highest measurable doses that can be recorded on the polycarbonate foil depend on the incident energy of the neutrons, as can be seen in Table 2 for several irradiation configurations. We define the lowest measurable dose as that dose which produces an increase in the number of pits of 3 standard deviations above the background. (The areas recorded are 0.25 cm$^2$ beyond each boron layer and 4 cm$^2$ in the region masked by boron material.) The highest measurable doses are determined by the difficulty in reading the polycarbonate foil when the number of pits is greater than ~7000 pits/cm$^2$. For mono-energetic neutrons the boron miniature spectrometer permits energy determination in the range from 1 eV to 30 keV while the ratio between particles due to albedo neutrons and those due to incident neutrons emitted toward the polycarbonate foil, permits energy determination in the range from 30 keV to 1 MeV. The experimental ratio $N_1/N_3=1.7$ for the unmoderated $^{124}$Sb-Be source is in excellent agreement with theory.

It was shown that it is possible to simultaneously reveal in the polycarbonate, damage sites produced by heavy-ion recoils (e.g. carbon and oxygen nuclei) and alpha particles. In order to keep the background as low as possible, the KOH solution must be mixed with only relatively small percentages (~14%) of ethyl alcohol and the temperature must be raised to 30° C. An increase of voltage above 1000 V increases the background. This increases the lowest measurable doses for neutrons above 1 MeV but has little effect on the extraction of dose below this energy.

One shortcoming of the polycarbonate foil is its lower efficiency for revealing alpha particles with energies higher than 1.7 MeV. For neutron energies up to 100 keV, the maximum energy of the alpha particles produced in the (n,α) reaction is around 1.6 MeV. For 1 MeV neutrons the maximum energy of alpha particles is 2.5 MeV, but most have energies of less than 2 MeV. This shortcoming is not of great significance for this dosimeter and may even be advantageous. The decrease in the efficiency of revealing high energy alpha particles helps decrease the contribution of alpha particles due to high energy neutrons above 1 MeV in the region masked by $^{10}$B material (N$_6$). As an example, for 2.5 MeV neutrons, 65% of the total number of alpha particles have energies greater than 1.7 MeV, and therefore will be revealed with a very low efficiency. However, it would be desirable to obtain a flat response to alpha particles up to 2.1 MeV. This can be done by replacing the polycarbonate foil by a CR-39 plastic and covering the region unmasked by boron material by a thin polyethelene proton radiator. The advantage of the material is that it has a revealing efficiency of unity up to high alpha particle energies.

The lowest measurable dose for neutrons below 1 MeV is less than 10 mRem. The highest measurable dose is limited by a maximum number of 7000 pits/cm$^2$ that can be read on the present dosimeter and therefore depends on the incident neutron energies.

To calibrate the dosimeter, it is necessary to use monoenergetic sources above and below 24 keV.

REFERENCES

Al 74 Alsmiller R. G. and Barish J., 1974 "The Calculated Response of $^6$LiF Albedo Dosimeters", *Health Phys.* 26, 13

An 63 Andersson I. O. and Braun J., 1963, "A Neutron Rem Counter with Uniform Sensitivity from 0.025 eV to 10 MeV," in: *Neutron Dosimetry*, Vol. 2, p. 87 (Vienna IAEA).

Car 78 Cartwright B. G., Shiek G. K. and Price P. B., 1978, "A Nuclear Track Recording Polymer of Unique Sensitivity and Resolution", *Nucl. Instr. Meth.* 153, 457

Ca 78 Cassou R. M. and Benton E. V., 1978 "Properties and Applications of CR-39 Polymeric Nuclear Track Detector" *Nucl. Track Detection* 2, 173.

Ei 78 Eisen Y. and Shamai Y., 1978, "A Flat Energy Response Dosimeter in the Epithermal Region", in: *Trans. Joint Annual Meeting of the Nuclear Societies of Israel.*

Ei 80a Eisen Y., Karpinovitch Z., Gavron, A., Tal A., Itzkin Y. and Schlesinger T., 1980, "Development of a Polycarbonate Fast Neutron Dosimeter and Comparison with the Conventional Emulsion Dosimeter", *Health Phys.* 38, 497

Ei 80b Eisen Y., Shamai Y., Ovadia E., Karpinovitch Z., Faermann S., and Schlesinger T., "Development of Neutron Dosimeters for Fast and Epithermal Neutrons", in: *Proc. of 5th Int. Conf. of IRPA*, March 1980, Ei 80c Eisen Y., Eliau A. and Karpinovitch, Z., 1980, "A Stable High Voltage, High Frequency Power Supply for Electrochemical Etching", Accepted for publication in: *Nucl. Instr. Meth.*

Gr 78 Griffith R. V., Fisher J. C., Hankins D. E. and Miller D. E., 1978, "Personnel Neutron Monitoring Development at LLL", in: *DOE Workshop on Personnel Neutron Dosimetry*, Pacific Northwest lab., Richland, Washington Gr 80 Griffith R. V., Fisher J. C., Tommasino L. and Zapparali G., 1980, "Development of a Personnel Neutron Dosimeter/Spectrometer", in: *Proc. of 5th Int. Conf. IRPA, Jerusalem, March* 1980

Ha 77 Hankins, D. E., 1977, "Neutron Dosimetry Studies at the Lawrence Livermore Laboratory 1977" Table 2, p. 72, in: *Sixth ERDA Workshop on Personnel Neutron Dosimetry*, Oak Ridge, Tenn.

Ka 68 Katz R. and Kobetich E. J., 1968, "Formation of Etchable Tracks in Dielectrics", Phys. Rev. 170, 401

NC 71 National Council on Radiation Protection and measurements, 1971, No. 38, Table 2, p. 16

Os 77 Oswald R. A. and Wheeler R. V., 1977, "Energy Dependence of Electrochemically Processed Track Etch Neutron Dosimeters," in: Proc. of the 22nd Annual Meeting of the Health Physics Soc., Atlanta, Ga.

Pi 78 Piesch E. and Burghardt B., 1978, "The Role of an Analyzer Type Albedo Dosimeter in Routine Monitoring and the Current Situation for the Calibration Technique", in: 7th DOE Workshop on Personnel Neutron Dosimetry, Pacific Northwest Lab., Richland, Washington.

Ro 79 Rogers D. W. O., 1979, "Why Not to Trust a Neutron Remmeter", Health Phys. 37, 735

So 74 Sohrabi M., 1974, "The Amplification of Recoil Particle Tracks in Polymers and its Application in Fast Neutron Dosimetry, "Health Phys. 27,598

So 77 Somogy, G., 1977, "Processing of Plastic Track Detectors", Nuclear Track Detection 1, 3

So 79 Sohrabi M, 1979, "A New Dual Response Albedo Neutron Personnel Dosimeter", Nucl. Instr. Meth. 165, 135

Te 75 Tessler G. and Glickstein S. S., 1975, "Monte-Carlo Calculation of the Response of the Portable Neutron Monitor SNOOPY", Health Phys. 28, 197

To 70 Tommasino L., 1970, "Electrochemical Etching of Damaged Track Detectors by H. V. Pulse and Sinusoidal Waveforms", CNEN Rep. RT/PROT (71), 1

To 80 Tommasino L., Zapparoli, G., Griffith, R. V. and Fisher, J. C., 1980, "Electrochemical Etching CR-39 Foils for Personnel Fast Neutron Dosimetry", in: Proc. of 5th International Congress of IRPA, March 1980, Jerusalem.

TABLE CAPTIONS

Table 1

Response efficiencies $N_i$ and $K_i$ of the dosimeter (in pits/cm$^2$/100 mRem total dose) for alpha+$^7$Li particles emerging from the $^{10}$B layers for different neutron spectra.

Table 2

Lowest and highest measurable doses for different neutron spectra for two cases: (a) the layers contain only $^{10}$B material; (b) the layers contain, in addition to the $^{10}$B material, a thin layer of natural boron in contact with the polycarbonate foil.

TABLE 2

| | $^{10}$B | | $^{10}$B + natural boron | |
|---|---|---|---|---|
| Source/moderator | Lowest doses (mRem) | Highest doses (mRem) | Lowest doses (mRem) | Highest doses (mRem) |
| $^{252}$Cf | 30 | 50,000 | 30 | 50,000 |
| $^{252}$Cf/5cm H$_2$O | 4 | 1,500 | 20 | 7,500 |
| $^{252}$Cf/10cm H$_2$O | 1.7 | 550 | 6.8 | 2,750 |
| $^{252}$Cf/10cm D$_2$O | 3 | 1,000 | 15 | 5,000 |
| $^{124}$Sb—Be | 0.4 | 150 | 2 | 750 |
| $^{124}$Sb—Be/5cm H$_2$O | 0.1 | 25 | 0.5 | 125 |

What is claimed is:

1. A neutron dosimeter comprising first, second, and third neutron detectors, said first neutron detector operative in the 1 eV to 30 KeV region, said second neutron detector operative in the range of 30 KeV to 1 MeV, and said third neutron detector operative in the 1 MeV to 14 MeV region, and a single polymer foil covered with a thin polyethylene layer, said polymer foil selected from the group consisting of bare polycarbonate foil and a diester of a carbonic acid, and said polymer foil serving as said first, second, and third neutron detectors.

2. A dosimeter according to claim 1, wherein there are provided three $^{10}$B layers of 60, 360 and 1500 mg/cm$^2$ thickness, located at a small distance from the polymer foil, and covered with a thin Cadmium layer and borated plastic on all sides except the front of the device.

3. A dosimeter according to claim 2, wherein the $^{10}$B layers are prepared by pressing $^{10}$B powder enriched to 92%, and these are 0.4 mm in front of the polymer foil.

4. A dosimeter according to claim 2, wherein the $^{10}$B layers of 360 and 1500 mg/cm$^2$ are shielded towards the body by borated plastic while the 60 mg/cm$^2$ layer is unshielded towards the body and collimated by an aperture in the cadmium and borated plastic.

5. A dosimeter according to claim 2, wherein the $^{10}$B layers are of cylindrical shape of about 5 to 10 mm diameter.

6. A dosimeter according to claim 1, comprising 4 $^{10}$B layers in the form of cylinders of 5 to 10 mm diameter, two of them of 60 mg/cm$^2$ the others of 360 and 1500 mg/cm$^2$ respectively, one of the 60 mg/cm$^2$ being unshielded towards the body of the wearer of the detector, the others being shielded towards the body by borated plastic.

7. The dosimeter according to claim 1, further comprising a $^{10}$B miniature spectrometer which includes said polymer foil as said first neutron detector.

8. The dosimeter according to claim 1 or claim 7, further comprising a $^{10}$B albedo detector which includes said polymer foil as said second neutron detector.

* * * * *

TABLE 1

| Source/moderator | $N_1$ | $N_2$ | $N_3$ | $N'_4$ | $K_1$ | $K_2$ | $K_3$ | $K'_4$ | $K_1/K_3$ | $K'_4/K_1$ | D(calc)* (mRem) | D(exp)* (mRem) |
|---|---|---|---|---|---|---|---|---|---|---|---|---|
| $^{252}$Cf | 76 | 73 | 69 | 2,250 | | | | 2,250 | | | | |
| $^{252}$Cf/5cm H$_2$O | 497 | 370 | 264 | 6,270 | 420 | 313 | 188 | 6,200 | 2.3 | 14.8 | 115 | 113 |
| $^{252}$Cf/10cm D$_2$O | 665 | 525 | 310 | 6,975 | 605 | 475 | 250 | 6,915 | 2.4 | 11.4 | 84 | 80 |
| $^{252}$Cf/10cm H$_2$O | 1,210 | 540 | 345 | 9,840 | 1,140 | 470 | 275 | 9,770 | 4.2 | 8.6 | 59 | 27 |
| $^{124}$Sb—Be | 4,870 | 3,950 | 2,900 | 61,075 | 4,870 | 3,950 | 2,900 | 61,075 | 1.7 | 12.5 | 100 | 100 |
| $^{124}$Sb—Be/5cm H$_2$O | 30,000 | 13,000 | 8,250 | 200,000 | 30,000 | 13,000 | 8,250 | 200,000 | 3.6 | 6.7 | 125 | 100 |

*D(calc) and D(exp) represent doses for energies below about 1 MeV. D(calc) is calculated by substituting $K_i$ in formula (2) and D(exp) is the measured value obtained by subtracting the dose extracted from the $^{237}$Np fission chamber from the dose given by the SNOOPY remmeter. D(calc) and D(exp) were normalized to a total dose of 1 Rem for $^{252}$Cf configurations and to 100 mRem for the $^{124}$Sb—Be configurations.